United States Patent
Watanabe et al.

(10) Patent No.: US 7,361,428 B2
(45) Date of Patent: Apr. 22, 2008

(54) BATTERY DEVICE

(75) Inventors: Kouji Watanabe, Fukushima (JP);
Yuho Ishikawa, Ibaraki (JP); Hidetoshi Akasawa, Ibaraki (JP)

(73) Assignee: Sony Corporation, Tokyo (JP)

( * ) Notice: Subject to any disclaimer, the term of this patent is extended or adjusted under 35 U.S.C. 154(b) by 482 days.

(21) Appl. No.: 10/506,621

(22) PCT Filed: Feb. 28, 2003

(86) PCT No.: PCT/JP03/02351

§ 371 (c)(1),
(2), (4) Date: Sep. 3, 2004

(87) PCT Pub. No.: WO03/075374

PCT Pub. Date: Sep. 12, 2003

(65) Prior Publication Data

US 2005/0130030 A1 Jun. 16, 2005

(30) Foreign Application Priority Data

Mar. 6, 2002 (JP) ............... 2002-060694

(51) Int. Cl.
*H01M 2/10* (2006.01)
(52) U.S. Cl. ............... 429/96; 429/7; 429/97
(58) Field of Classification Search .......... None
See application file for complete search history.

(56) References Cited

U.S. PATENT DOCUMENTS 6,068,946 A * 5/2000 Zedell et al. ............ 429/100

FOREIGN PATENT DOCUMENTS

| CN | 1281265 | 1/2001 |
|----|---------|--------|
| EP | 1 033 766 | 9/2000 |
| JP | 11-176400 | 7/1999 |
| JP | 2000-340194 | 12/2000 |
| JP | 2001-093495 | 4/2001 |
| JP | 2001-307703 | 11/2001 |
| JP | 2002-117819 | 4/2002 |

* cited by examiner

*Primary Examiner*—Jonathan Crepeau
(74) *Attorney, Agent, or Firm*—Robert J. Depke; Rockey, Depke & Lyons, LLC.

(57) ABSTRACT

The battery apparatus according to the present invention has the structure in which a lid is engaged with a battery storage to cover a storage portion storing a battery unit via a first fixing means employing a simple structure. Further, the battery storage is formed of the frame and a closing unit engaged via a second fixing means only employing a simple structure.

Furthermore, since the battery storage, or the lid, or the closing unit is formed of metal; and the thickness thereof is made thinner, the capacity of the storage portion can be increased to the extent of the reduction in the thickness, whereby the amount of electricity can be increased.

17 Claims, 8 Drawing Sheets

BATTERY DEVICE

CROSS REFERENCES TO RELATED APPLICATIONS

This application claims priority to Japanese Patent Application Number JP2002-060694, filed Mar. 6, 2002 which is incorporated herein by reference.

TECHNICAL FIELD

The present invention relates to a battery apparatus used, for example, as a power source for a mobile phone unit or other electronic equipment, in which a battery unit containing an element of generating power is stored in a storage portion formed by overlapping a battery storage and a lid.

BACKGROUND OF THE INVENTION

As a first example of a battery apparatus having such structure, a battery apparatus having, for example, the structure shown in FIG. 8 has been conventionally known. A battery apparatus 1 shown in FIG. 8 includes a battery unit 2 having a power-generating element, a battery storage 3 having a storage portion 5 in which the battery unit 2 is stored, and a lid 4 to close the storage portion 5 of the battery storage 3.

The battery apparatus 1 is used, for example, as a power source for a mobile phone unit, and the battery unit 2 has an arched-shape due to the limitation of the space to be stored in the mobile phone unit. As the battery unit 2, for example, polymer secondary cell is employed. The battery storage 3 for storing the battery unit 2, and the lid 4 are formed of synthetic resin such as polycarbonate (PC).

On the periphery of the battery storage 3 surrounding the storage portion 5, a step portion is circumferentially provided. On the other hand, a corresponding step portion engaged with that step portion of the battery storage 3 is provided on the periphery of the lid 4. By engaging the step portion of the lid 4 with that of the battery storage 3, the positions of the battery storage 3 and the lid 4 are determined to each other and the battery storage 3 and lid 4 are overlapped in a predetermined state. Contacting portions of the battery storage 3 and the lid 4 are joined, for example, by bonding means such as ultrasonic deposition, and the battery storage 3 and the lid 4 are connected to be integrally formed.

Two electrode terminals 2a, 2b are lead out from the battery unit 2 and are connected to a circuit substrate 6a of a control circuit 6 provided for controlling discharge, charge, and so on of the battery unit 2. To the circuit substrate 6a, there are connected a pair of terminals 3a, 3b provided on the battery storage 3, through which the circuit substrate is connected to the outside. Numeral 7 denotes an insulating board functioning as a partition to separate the battery unit 2 and the controlling circuit 6. Further, numeral 8a denotes double-faced tape for fixing the battery unit 2 in the lid 4, and numeral 8b denotes a double-faced tape for fixing the battery unit 2 in the battery storage 3.

However, with respect to the conventional battery apparatus 1 having such structure, since the battery storage 3 and the lid 4 are both formed of synthetic resin, it is difficult to meet the demand of providing a thinner battery storage 3 and lid 4, and therefore there was a problem in which capacity of the power-generating element can not be increased in the case where the outside dimensions are unchanged.

For example, with respect to a mobile phone unit, while a smaller unit body is strongly requested, such demand as to be able to use the unit as long as possible has been extremely great. Therefore, there is a strong desire to obtain a mobile phone unit in which only the capacity of a power-generating element is made to be large enough to discharge for a long period of time without changing the outside dimensions of the battery apparatus 1.

However, in the above-mentioned battery apparatus 1, since the battery storage 3 and the lid 4 are both formed of synthetic resin that has problems in pliability, strength, and the like, it is difficult to reduce the thickness of the battery storage 3 and the lid 4.

In order to solve the above problems, as shown in FIG. 9, there has been provided a battery apparatus 10 with an improved structure. In the battery apparatus 10, only a battery storage 11 and a lid 12 are improved and no other constituents are modified. Accordingly, hereupon only the battery storage 11 and the lid 12 will be explained, and to other constituents the same numerals are given and the explanation thereof is omitted.

The battery storage 11 of the battery apparatus 10 is composed of a frame 13 in which a large square opening 11a is provided on the lower surface portion thereof and a closing unit 14 which is integrally provided with the frame 13 to close the opening 11a. Similarly, the lid 12 is composed of a frame 15 in which a large square opening 12a is provided on the upper surface portion thereof and a closing unit 16 which is integrally provided with the frame 15 to close the opening 12a. While the frames 13 and 15 are formed of synthetic resin, the closing units 14 and 16 are formed of metal, and by employing what is called insert molding the frames and closing units are integrally formed.

Further, in FIG. 9, a numeral 9a denotes a double-face tape also functioning as an insulating tape provided between the battery unit 2 and the lid 12. Further, a numeral 9b denotes a double-face tape also functioning as an insulating tape provided between the battery unit 2 and the battery storage 11.

According to the battery apparatus 10 which includes the battery storage 11 and the lid 12 having such structure, if the outside dimensions are identical and each member has the same strength, members formed of metal can be made extremely thinner compared to those formed of synthetic resin. Accordingly, with respect to the battery storage 11 and the lid 12, a capacity of the storage portion 5 can be made larger to the amount of decrease in the thickness of the closing units 14 and 16 which are formed of metal. Consequently, the thickness of the battery unit 2 can increase as much as the capacity of the storage portion 5 increases, thereby increasing the capacity of the battery unit 2 to obtain a larger amount of electricity.

However, in the above-mentioned improved battery apparatus 10, since the insert molding is required to fabricate both the battery storage 11 and the lid 12, it is necessary to prepare a molding die having a complicated structure, which causes problems of increasing production cost and requiring much time and work in a production process.

The present invention is made in light of the above problems and provides a battery apparatus, in which a lid that closes the end of an opening of a storage portion of a battery storage, or a closing unit that closes the bottom of the battery storage is formed to be capable of being engaged with the battery storage; means for fixing the lid to the battery storage or for fixing the closing unit to the lid is provided to firmly fix the lid to the battery storage, or to firmly fix the closing unit to the lid to be integrally formed, respectively, preventing each member from being separated; and a capacity of the storage portion is made as large as possible to increase the capacity of the battery unit and thus increase the amount of electricity.

SUMMARY OF THE INVENTION

A battery apparatus according to the present invention includes: a battery unit which contains a power-generating element, a battery storage having a storage portion in which the battery unit is stored, and a lid which closes the end of an opening of the storage portion of the battery storage, wherein a first fixing means for enabling the lid to be engaged with the battery storage and for fixing the lid to the battery storage is provided.

DETAILED DESCRIPTION OF THE PREFERRED EMBODIMENTS

Hereinafter, embodiments of the present invention will be explained referring to the attached drawings.

Figure 1:
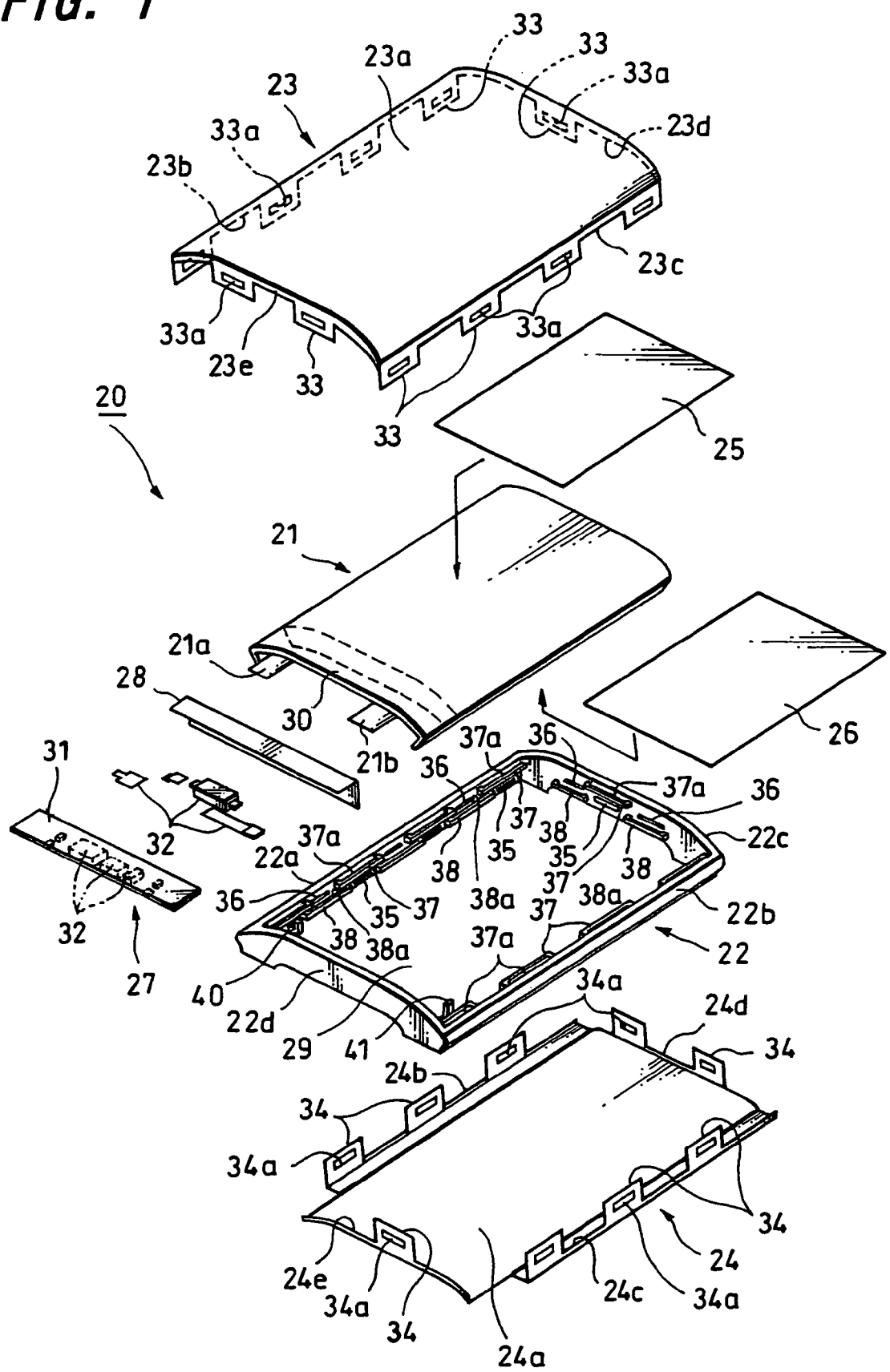
FIG. 1 is an exploded perspective view showing a first embodiment of a battery apparatus according to the present invention.

As shown in FIG. 1, a battery apparatus 20 showing an embodiment of the present invention includes: a battery unit 21 in which a power-generating element is contained, a frame 22 having a storage portion 29 in which the battery unit 21 is stored, an upper case 23 that is a specific example of a lid which closes the upper surface, that is, a one surface side of the storage portion 29 of the frame 22, a lower case 24 that is a specific example of a closing unit which closes the lower surface, that is, the other surface side of the storage portion 29 of the frame 22, upper and lower insulating sheets 25 and 26, a control circuit 27, an insulating plate 28, and the likes.

As the battery unit 21, for example, a nonaqueous electrolytic secondary battery (such as a polymer secondary battery, lithium ion secondary battery, or the like) can be applied. There is provided the battery unit 21 in which, for example, through a separating member formed of polymer film a positive electrode and a positive collector are lapped over a negative electrode and a negative collector to be contained in a covering member formed of a laminated film of aluminum foil and plastic, and in vacuum the periphery of the covering member is subjected to the thermal deposition to be sealed. From the covering member, an electrode terminal 21a connected to the positive collector and an electrode terminal 21b connected to the negative collector are lead out.

The battery unit 21 has a rectangular-shaped plane, on a side in a longitudinal direction of which a U-shaped circuit storage portion 30 formed by utilizing a part of the covering member subjected to the thermal deposition is provided. In the circuit storage portion 30, a control circuit 27 is stored in a space divided by an insulating plate 28 formed of an insulative plastic sheet or the like. The control circuit 27 includes a circuit substrate 31 provided with a predetermined circuit pattern, and to the circuit substrate 31 the terminals 21a and 21b of positive and negative electrodes are connected. Further, on both the surfaces of the circuit substrate 31 various kinds of electronic components 32 are mounted so that the charge, discharge and so on of the battery unit 21 are controlled for the safety and to prevent irreversible breakdown of the electrodes caused by overcharge and over discharge.

The frame 22 is formed of a frame-shaped member capable of completely containing the battery unit 21, in which the storage portion 29 is composed of a square-shaped opening provided through the top and bottom surfaces. Specifically, the frame 22 includes long side portions 22a, 22b provided parallel to oppose each other, and short side portions 22-c, 22d provided parallel to oppose each other extending in the direction intersecting the long sides. The frame 22 is shaped like an arch which is curved corresponding to the shape of the battery unit 21 with the upper surface thereof protruding convexly and the lower surface thereof being bent concavely.

The upper case 23 is dome-shaped, whose upper surface is curved like an arch corresponding to the shape of the upper surface of the frame 22. The upper case 23 has an upper surface portion 23a that closes one end of the opening, which constitutes one surface of the storage portion 29 of the frame 22, and long side surface portions 23b, 23c and short side surface portions 23d, 23e that continue to the four sides of the upper surface portion 23a, respectively. Further, on respective side surface portions 23b to 23e of the upper case 23 an appropriate number of fixing pieces 33 are provided. In this embodiment, there are provided four fixing pieces 33 on each of the long side surface portions 23b, 23c, one fixing piece 33 on one of the short side surface portions, that is, the short side surface portion 23d, and two fixing pieces 33 on the other short side surface portion 23e. Furthermore, in each of the fixing pieces 33 there is provided an oblong-shaped engaging hole 33a which represents a specific example of a concave portion.

The lower case 24 has a convexly curved lower surface corresponding to the shape of the lower surface of the frame 22. The lower case 24 has a lower surface portion 24a that closes the other end of the opening, which constitutes another surface of the storage portion 29 of the frame 22, and long side surface portions 24b, 24c and short side surface portions 24d, 24e which continue to four sides of the lower surface portion 24a, respectively. Further, on respective side surface portions 24b to 24e of the lower case 24 an appropriate number of fixing pieces 34 are provided. In this embodiment, there are provided three fixing pieces 34 on each of the long side surface portions 24b, 24c, two fixing pieces 34 are provided on one of the short side surface portions, that is, the short side surface portion 24d, and one fixing piece 34 on the other short side surface portion 24e of the lower case 24. Furthermore, in each of the fixing pieces 34 there is provided an oblong-shaped engaging hole 34a which represents a specific example of a concave portion.

In addition, on the inside surfaces of the four sides of the frame 22, that is, long side portions 22a, 22b and short side portions 22c, 22d, engaging hooks 35, 36 representing a specific example of a convex portion that each constitute first fixing means and second fixing means by being combined with the engaging hole 33a in the fixing piece 33 of the upper case 23 and being combined with the engaging hole 34a in the fixing piece 34 of the lower case 24, respectively, and peaked portions 37, 38 supporting the base portions of respective fixing pieces 33, 34 which are engaged with those engaging hooks 35, 36 are provided in number equal to that of the corresponding fixing pieces 33, 34.

Figure 5:
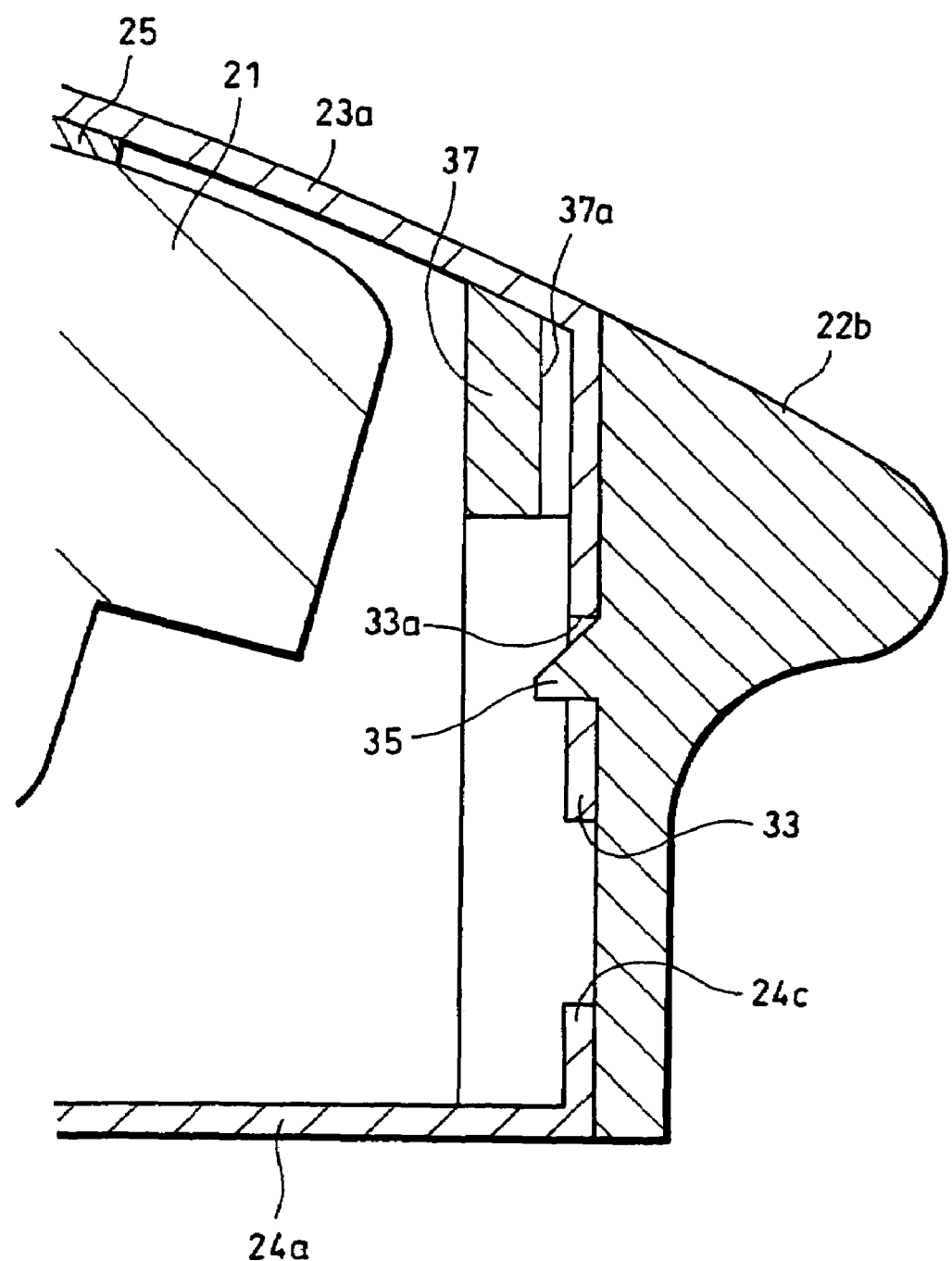
FIG. 5 is an enlarged explanatory view showing the right side portion of FIG. 4, which is a relevant part.

In a plurality of the engaging hooks 35, 36, the engaging hooks 35 are to fix the fixing pieces 33 of the upper case 23, and, as shown in FIG. 5, have a hook-shape in which the upper surface thereof is inclined corresponding to the upper fixing piece 33 that is inserted downward, and the lower surface thereof is plane. Above the upper engaging hooks 35, upper peaked portions 37 protruding like overhangs are each provided. Further, in each of the upper peaked portions 37 there is provided a slit 37a through which the upper fixing portion 33 is made to pass.

Figure 4:
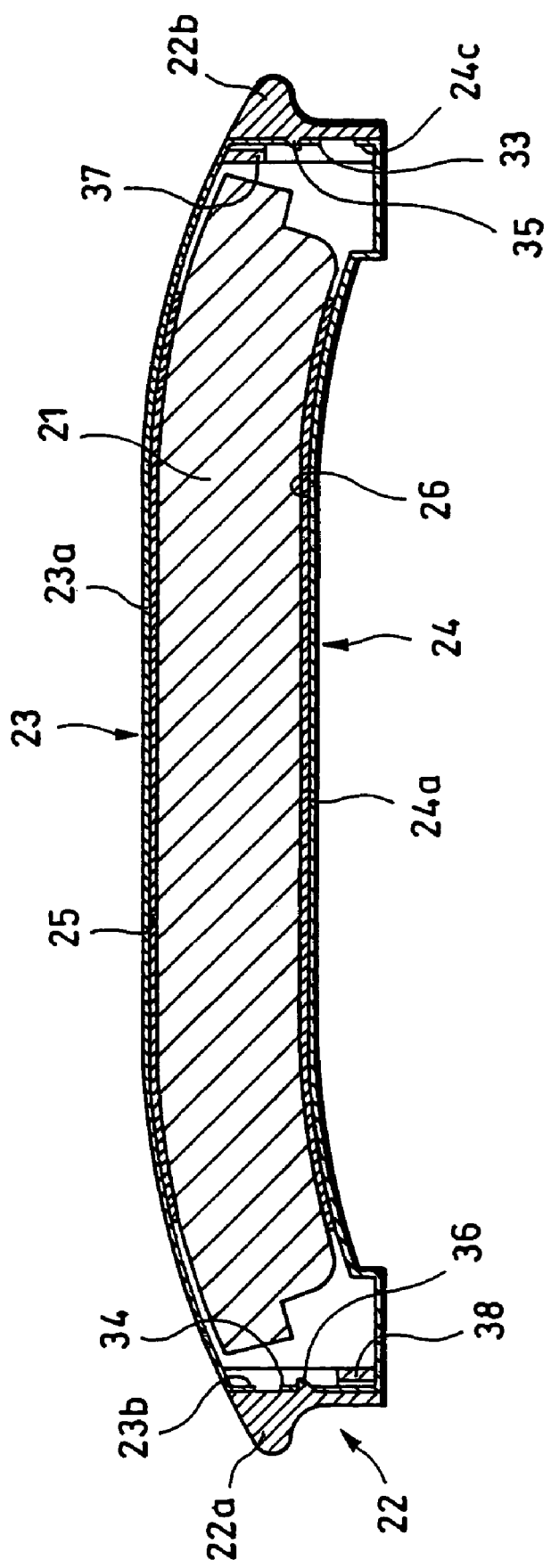
FIG. 4 is a cross-sectional view taken by a Y-Y line in FIG. 2, showing the first embodiment of the battery apparatus according to the present invention.

On the other hand, the other engaging hooks 36 are to fix the fixing pieces 34 of the lower case 24, and, as shown in FIG. 4, have a hook-shape in which the lower surface thereof is inclined corresponding to the lower fixing piece 34 that is inserted upward, and the upper surface thereof is plane. Under the lower engaging hooks 36 lower peaked portions 38 of protruding edges are each provided. Further, in each of the lower peaked portions 38 there is provided a slit 38a through which the lower fixing portion 34 is made to pass.

Specifically, in the two long side portions 22a, 22b of the frame 22 there are provided four engaging hooks 35 and four peaked portions 37 corresponding to the fixing pieces 33 of the upper case 23, and three engaging hooks 36 and three peaked portions 38 corresponding to the fixing pieces 34 of the lower case 24. Further, in one of the short side portions, that is, the short side portion 22c of the frame 22 there are provided one engaging hook 35 and one peaked portion 37 corresponding to the fixing piece 33 of the upper case 23, and two engaging hooks 36 and two peaked portions 38 corresponding to the fixing pieces 34 of the lower case 24 are provided. Then, in the other short side portion 22d of the frame 22 there are provided two engaging hooks 35 and two peaked portions 37 corresponding to the fixing pieces 33 of the upper case 23, and one engaging hook 36 and one peaked portion 38 corresponding to the fixing pieces 34 of the lower case 24.

As shown in FIG. 4, the upper engaging hooks 35 and lower engaging hooks 36 are set at an approximately equal height, and are alternately disposed. Accordingly, when the upper case 23 and lower case 24 are attached to the frame 22 including such upper and lower engaging hooks 35, 37, the upper fixing pieces 33 and the lower fixing pieces 34 are joined to be engaged such that the pieces are meshed with each other, and disposed alternately.

Figure 2:
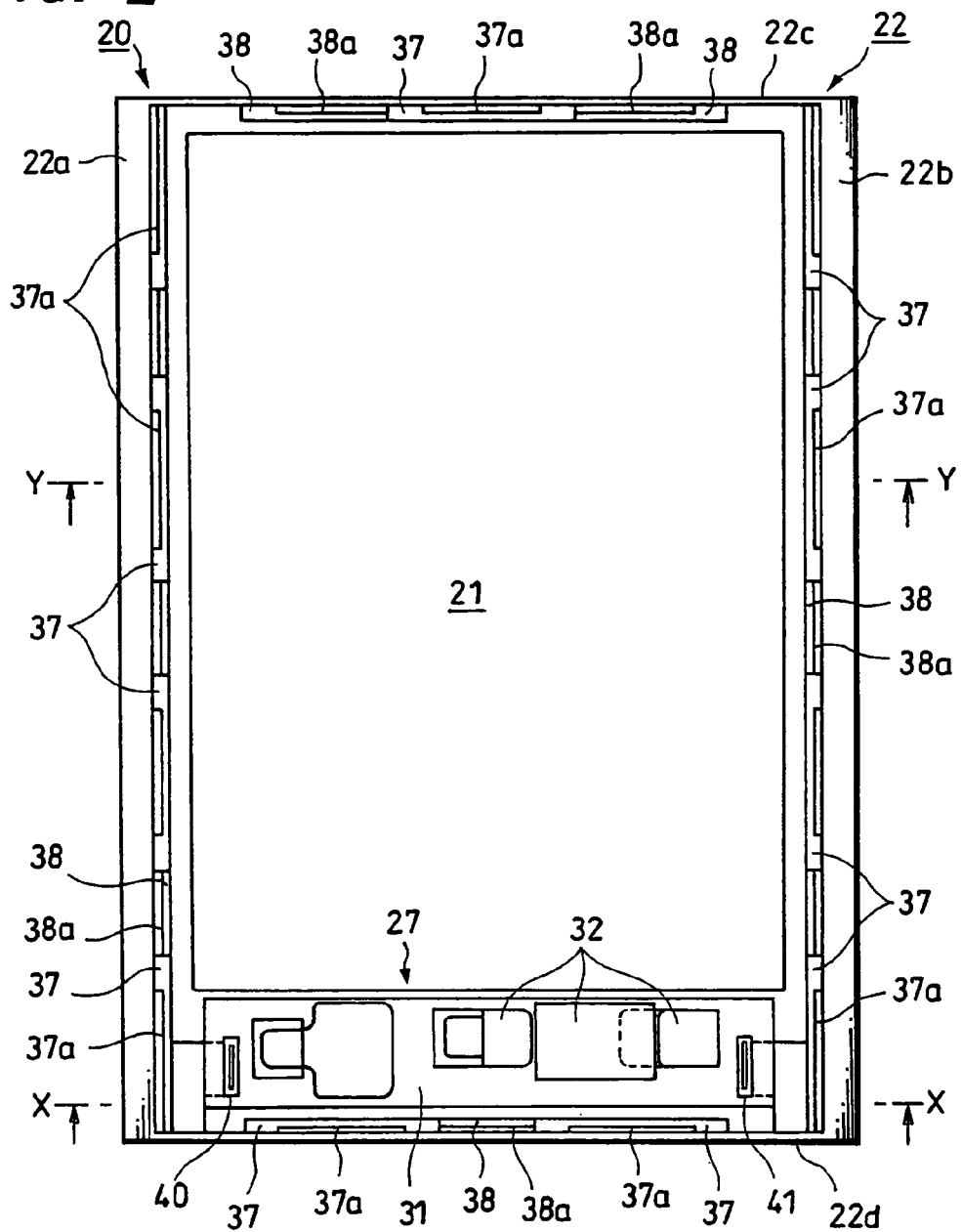
FIG. 2 is a plan view showing the first embodiment of the battery apparatus according to the present invention with an upper case thereof being removed.
Figure 3:
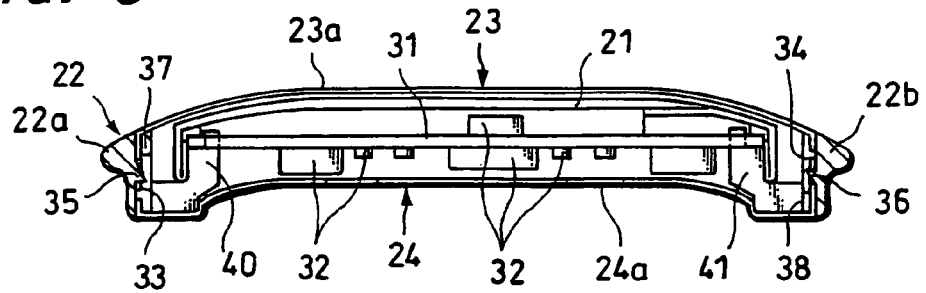
FIG. 3 is a cross-sectional view taken by an X-X line in FIG. 2, showing the first embodiment of the battery apparatus according to the present invention.

Further, on both sides of the short side portion 22d of the frame 22 there are integrally formed a pair of supporting portions 40, 41 which hold both ends of the circuit substrate 31 of the above-mentioned control circuit 27. As shown in FIGS. 2 and 3, the pair of supporting portions 40, 41 is engaged with a pair of holes bored on the circuit substrate 31 to support the both ends of the circuit substrate 31, so that the circuit substrate 31 is disposed to divide the circuit storage portion 30 of the battery unit 21 into upper and lower parts. As a result, an appropriate space is provided above and under the circuit substrate 31, so that on both surfaces of the circuit substrate 31 desired electronic components can be mounted.

Therefore, according to the above embodiment, compared to the case where electronic components are mounted on only one surface of a circuit substrate, approximately twice the number of electronic components can be mounted on the circuit substrate. Accordingly, the circuit substrate is efficiently used, and larger number of mechanical structures can be mounted to improve a safety circuit and so on.

Although as the material for the frame 22 having the above-described structure, for example, polycarbonate (PC) can be employed, needless to say other engineering plastics can also be used as well as metal and other materials than plastics. Further, though stainless steel (such as SUS304 or the like), for example, is preferable as the material for the upper case 23 and lower case 24, needless to say other metals can also be applied.

One of the insulating sheets, that is, the insulating sheet 25 is provided between the battery unit 21 and the upper case 23 to ensure the insulation; and though the sheet is preferably made of polyester, other sheet-shaped insulating members such as other plastics, paper, and other materials can also be applied. On the other hand, the other insulating sheet 26 provided between the battery unit 21 and the lower case 24 has a function of not only ensuring the insulation but also fixing the battery unit 21. Therefore, on a surface of the lower insulating sheet 26 an adhesive layer is provided by, for example, coating the surface with adhesive to bond the adhesive layer with the battery unit 21. By means of the lower insulating sheet 26, the movement of the battery unit 21 can be restrained or prevented, and the battery unit is prevented from being lopsided.

The battery apparatus 20 having the above structure can be manufactured, for example, through the following assembly process. First, the lower case 24 is attached to the frame 22. In this embodiment, the lower surface of the frame 22 is opposed to the side of the lower case 24, from which the fixing pieces 34 are protruded, and a number of fixing pieces 34 are inserted upward into the storage portion 29 composed of the opening of the frame 22. Specifically, each of the fixing pieces 34 is individually inserted and pressed into the slit 38a of the corresponding lower peaked portion 38 provided on the lower surface side of the frame 22. Thus, with respect to each fixing piece 34, the tip thereof slides along a slope portion to climb over the lower engaging hook 36, and the lower engaging hook 36 enters the engaging hole 34a provided in each fixing piece 34.

As a result, as shown in FIG. 4, the engaging holes 34a of the lower fixing pieces 34 and the lower engaging hooks 36 of the frame 22 are engaged to form the second fixing means, through which the lower case 24 is fixed to the frame 22 and assembled. In the storage portion 29 of the frame 22, whose lower surface is closed by the lower case 24, there is stored the battery unit 21 to which the control circuit 27 and the insulating plate 28 are attached in advance. At that time, the lower insulating sheet 26 is bonded with the lower surface of the battery unit 21 to be integrally provided. Then, on the upper surface of the battery unit 21 the upper insulating sheet 25 is disposed.

Next, the upper case 23 is attached to the frame 22. In this embodiment, the storage portion 29 of the frame 22 is opposed to the side of the upper case 23, from which the fixing pieces 33 are protruded. Then, each of the fixing pieces 33 of the upper case 23 is individually inserted and pressed into the slit 37a of the corresponding upper peaked portion 37 provided on the upper surface side of the frame 22. Thus, with respect to each fixing piece 33, the tip thereof slides along a slope portion to climb over the upper engaging hook 35, and the upper engaging hook 35 enters the engaging hole 33a provided in each fixing piece 33.

As a result, as shown in FIGS. 4 and 5, the engaging holes 33a of the upper fixing pieces 33 and the upper engaging hooks 35 of the frame 22 are engaged to form the first fixing means, through which the upper case 23 is fixed to the frame 22 and assembled. Accordingly, the upper surface of the storage portion 29 of the frame 22 is closed by the upper case 23, thereby completing the assembly process of the battery apparatus 20.

According to the battery apparatus 20, after the positions of the upper case 23 and the lower case 24 are determined with respect to the frame 22, respective cases 23 and 24 are pressed toward the frame 22 side, so that the upper case 23 and the lower case 24 can be fixed to the frame 22 easily and rapidly. Further, when the upper case 23 and the lower case 24 are once attached, the first and second fixing means, through which both the cases are respectively fixed, are formed between each of the cases and the frame 22, and since each of the engaging hooks 35 and 36 serves as a stopper for preventing falling-off, there is no possibility that the upper case 23 and the lower case 24 disengage from the frame 22, thereby enabling the original assembled state to be maintained.

Further, since the upper case 23 and the lower case 24 are formed of metal, particularly formed of stainless steel, while the strength of each case is maintained to a predetermined degree, the thickness thereof can be made as thin as possible. Therefore, a capacity of the storage portion 29 can be increased to the extent of the decrease in thickness of each case. Accordingly, a capacity of the battery unit 21 can be increased corresponding to the increase in the capacity of the storage portion 29, whereby the amount of electricity such as generated, charged and the like of the battery unit 21 can be increased.

Figure 6:
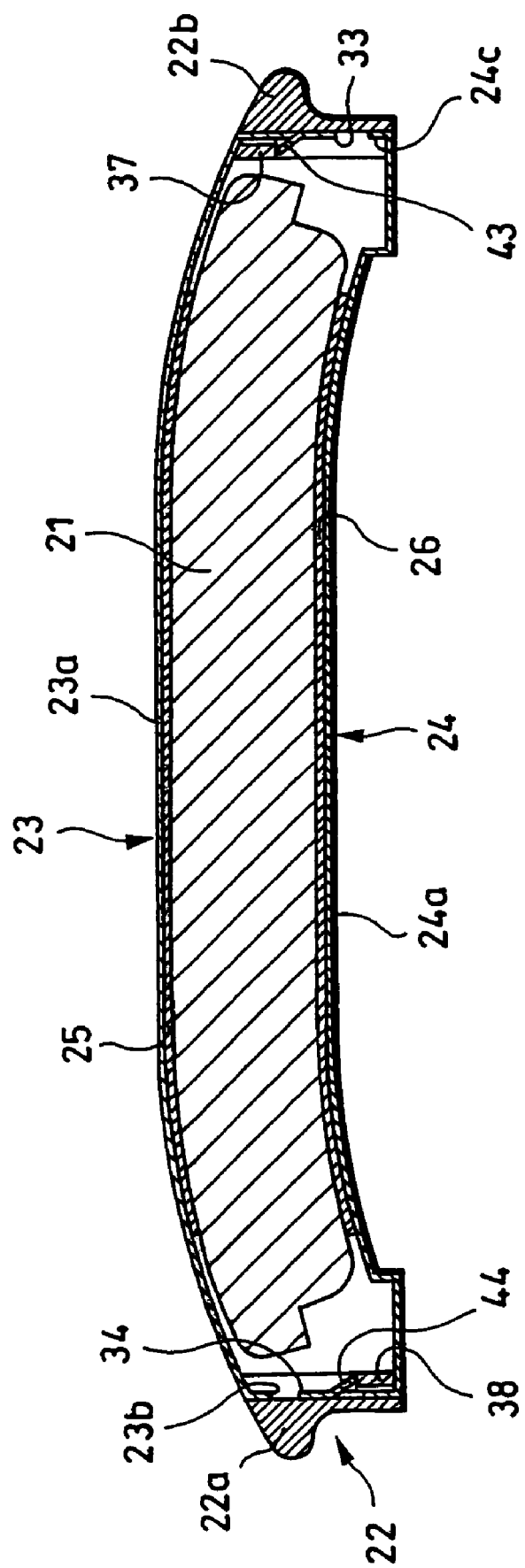
FIG. 6 is a cross-sectional view showing a second embodiment of the present invention in which the portion corresponding to the Y-Y line section is shown in enlarged scale.
Figure 7:
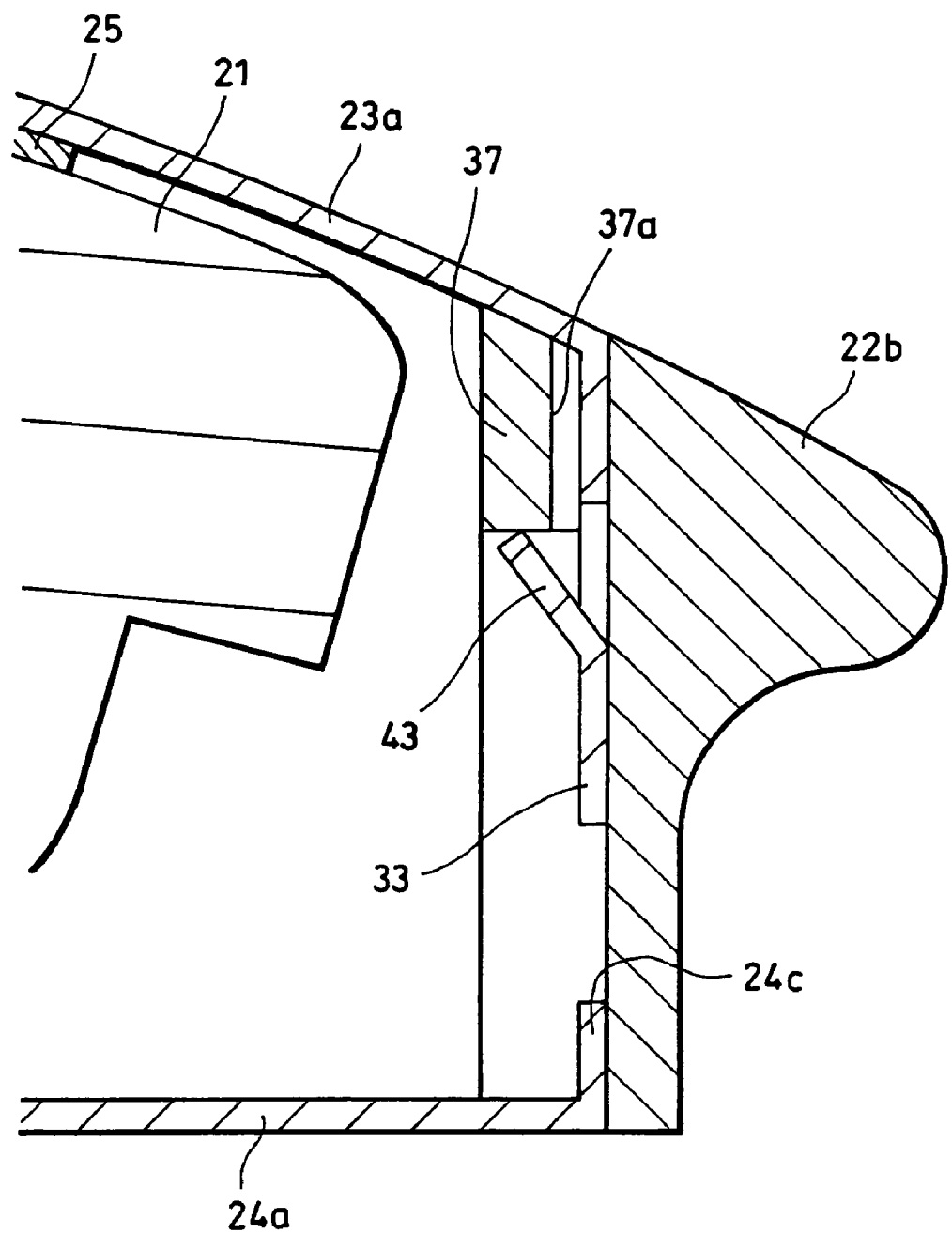
FIG. 7 is an enlarged explanatory view showing the right side portion of FIG. 6, which is a relevant part.
Figure 8:
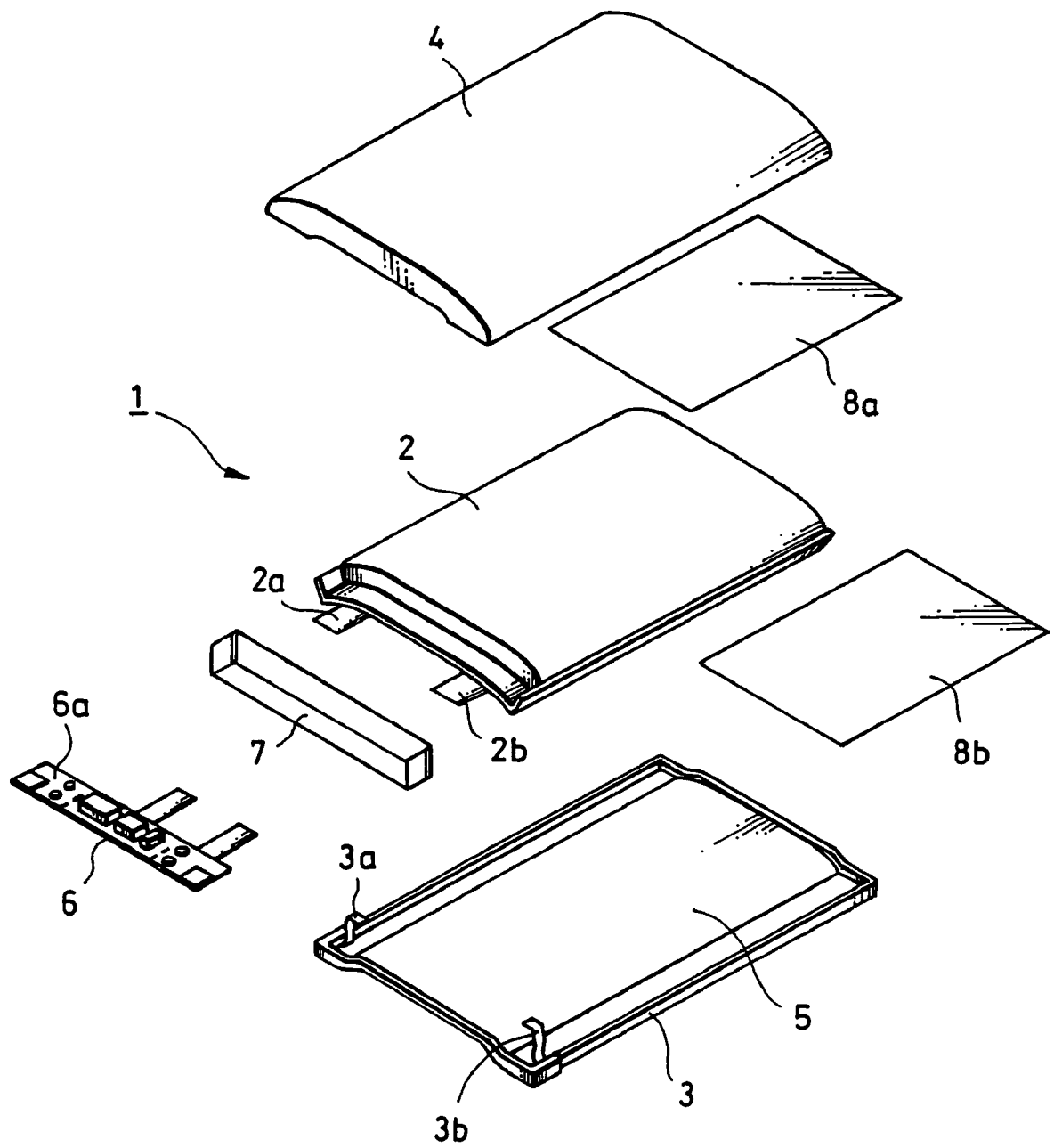
FIG. 8 is an exploded perspective view showing a schematic construction of a first example of a conventional battery apparatus.
Figure 9:
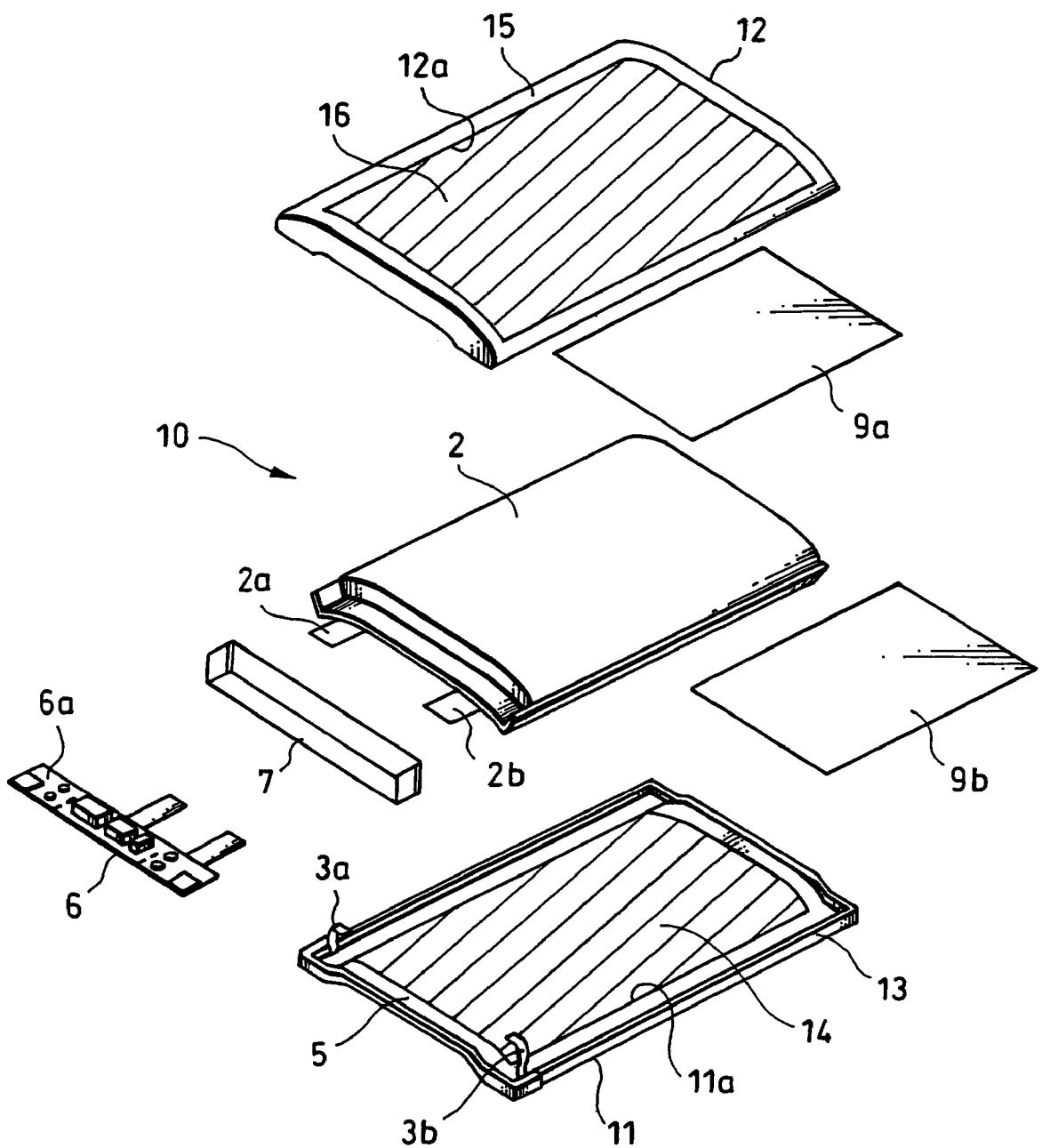
FIG. 9 is an exploded perspective view showing a schematic construction of a second example of a conventional battery apparatus.

FIGS. 6 and 7 show another embodiment of the above-described first and second fixing means. In this embodiment, while upper and lower engaging hooks 35, 36, and the engaging holes 33a, 34a provided in the upper and lower fixing pieces 33, 34 of the above-described first embodiment are not provided, in each of the fixing pieces 33, 34 of the upper case 23 and the lower case 24 there are provided projections 43, 44 representing a second embodiment of the convex portions constituting one member of the fixing means, and the concave portions, to which the above projections are engaged, are provided by using the inside surface of the peaked portions 37, 38.

In the fixing pieces 33, 34 of the upper case 23 and lower case 24, the projections 43, 44 are respectively formed by cutting parts of the fixing pieces 33, 34 to the inside. As shown in FIG. 7, in the upper fixing piece 33 of the upper case 23 there is provided a cut-out portion in which three other sides than the end side are cut out in a U-shape, and the free end of the cut-out portion is bent toward the inside, thereby forming each of the projections 43, 44 having an appropriate resilience. Since the other structure is the same as the above-described embodiment, the same numerals are given to the corresponding parts and the explanation thereof will be omitted.

The second embodiment of the battery apparatus 20 having such structure can be manufactured similarly to the first embodiment. Specifically, since the upper case 23 and the lower case 24 are sequentially assembled with respect to the frame 22 in a similar order, the assembly can be executed easily and rapidly. In this embodiment, for example, when the fixing piece 33 of the upper case 23 (the lower case 24 in similar manner) is inserted through the slit 37a of the upper peaked portion 37 of the frame 22, the projection 43 (the projection 44 in similar manner) is resiliently deformed with its own resilience and returns to the original shape after passing through the upper peaked portion 37.

According to the above structure, as shown in enlarged scale in FIG. 7, the tip of the projection 43 is engaged with the inside surface of the upper peaked portion 37. Accordingly, the upper case 23 is firmly fixed to the frame 22 and is prevented from being disengaged. Similar effectiveness to that of the above-described first embodiment is obtained when the upper case 23 and lower case 24 having such fixing means are employed, and therefore the amount of electricity of the battery unit 21 can be increased.

Having described above, the present invention is not limited to the aforementioned embodiments, and in the above embodiments, though, for example, there was explained an example in which the second battery having a cross section of the arched shape is employed, needless to say batteries having other cross sections such as a rectangular shape, an elliptic (oval shape) shape and other appropriate shapes can be applied. Further, although as the battery unit an example of a polymer secondary battery in which power-generating element is contained and sealed in an aluminum laminated film is applied to the above embodiment, a secondary battery in other shapes and structures can also be applied.

Furthermore, though in the above-described embodiments there was explained an example in which engaging hooks 35, 36 having a cross section of a triangle shape are employed as the convex portion, other shapes such as a semi-circle, hemi-sphere, conical shape and so on can also be employed. Moreover, the frame can also be formed with metal similar to the upper and lower cases, and can be formed such that the fixing pieces are also provided on the frame with a convex portion being provided in one of the fixing pieces and with a concave portion being provided in the other fixing pieces.

Furthermore, in the above embodiments, though the frame 22 and the lower case 24 are formed of separate members and the lower case 24 is integrally assembled with the frame 22, it is also possible to originally provide the frame and lower case using a single member and only the upper case is subsequently attached.

Accordingly, the present invention can be variously modified without departing from the gist thereof.

The invention claimed is:

1. A battery apparatus comprising: a frame comprising two pairs of parallel edge portions adjoined to one another and that defines a storage portion within the frame in which a battery unit is stored, the storage portion also having open upper and lower regions,
    a first lid that closes one of the upper and lower open regions of said storage portion,
        wherein said first lid is capable of being engaged with said battery frame, a first fixing means for fixing the first lid to the battery frame is provided on an inner side surface of the frame facing the battery unit storage portion a second lid that closes the other of the upper and lower open regions of said storage portion, wherein said second lid is capable of being engaged with said battery frame, and a second fixing means for fixing the second lid to the battery frame is provided on an inner side surface of the frame facing the battery unit storage portion, the second fixing means being offset in a lateral direction of the frame from the first fixing means.

2. The battery apparatus according to claim 1, wherein said first fixing means is formed of a convex portion provided on one of said battery storage and said lid, and a concave portion that is provided on the other and is capable of being engaged with said convex portion.

3. The battery apparatus according to claim 1, wherein said battery storage is formed of synthetic resin or metal, and said lid is formed of metal.

4. The battery apparatus according to claim 2, wherein said second fixing means is formed of a convex portion provided on one of said frame and said closing unit, and a concave portion that is provided on the other and is capable of being engaged with said convex portion.

5. The battery apparatus according to claim 4, wherein a plurality of fixing pieces are respectively provided on each of said first and second lids to be disposed such as meshed with each other in the state where the first and second lids are being engaged with said frame, and in each of said plurality of fixing pieces a concave portion or a convex portion is provided to be engaged with the convex portion or the concave portion provided on said frame.

6. The battery apparatus according to claim 4, wherein said frame is formed of synthetic resin or metal, and said closing unit is formed of metal.

7. The battery apparatus according to claim 1, wherein in said battery storage area a pair of supporting portions are provided that support the both ends of a circuit substrate of a control circuit for controlling said power-generating element in said battery unit, and on both the top and bottom surfaces of said circuit substrate supported by the pair of supporting portions, electronic components constituting said control circuit are mounted.

8. The battery apparatus according to claim 1, wherein said first and second fixing means are comprised of protrusions extending from the inner side surfaces of the frame towards the battery unit storage portion, the protrusions providing a slot into which a portion of the first and second lids can be inserted into, and corresponding engaging hooks formed in a vertical direction of the frame beyond the protrusions, which thereby fix the respective first and second lids to the frame.

9. The battery apparatus according to claim 8, wherein the protrusions and engaging hooks for providing attachment of the first lid and the protrusions and engaging hooks for providing attachment of the second lid are formed in an alternating fashion around the inner diameter of the frame.

10. The battery apparatus according to claim 8, wherein the protrusions for providing a slot for the first lid are formed closer to one of the upper and lower open surfaces of said storage portion than a mid-point of the frame, and the protrusions for providing a slot for the second lid are formed closer to the other of the upper and lower open surfaces of said storage portion than a mid-point of the frame.

11. The battery apparatus according to claim 1, wherein each of said frame, said upper lid, and said lower lid are formed in an arched-shape.

12. The battery apparatus according to claim 11, wherein said battery unit is formed in an arched-shape.

13. The battery apparatus according to claim 3, wherein each of said frame, said upper lid, and said lower lid are formed in an arched-shape.

14. The battery apparatus according to claim 13, wherein said battery unit is formed in an arched-shape.

15. The battery apparatus according to claim 6, wherein each of said frame, said upper lid, and said lower lid are formed in an arched-shape.

16. The battery apparatus according to claim 15, wherein said battery unit is formed in an arched-shape.

17. The battery apparatus according to claim 5, wherein each of said fixing pieces are comprised of a cut-out portion of the respective upper or lower lid in which three other sides than the end side are cut out in a U-shape, and the free end of the cut-out portion is bent toward the inside.

* * * * *